Figure 17:
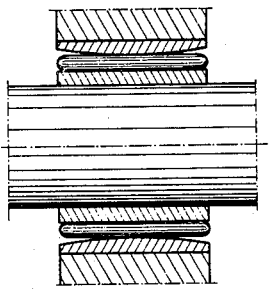

Oct. 17, 1961    A. PITNER    3,004,323
PROCESS OF MANUFACTURING BEARINGS AND
BEARINGS RESULTING THEREFROM
Filed Dec. 23, 1957    3 Sheets-Sheet 1
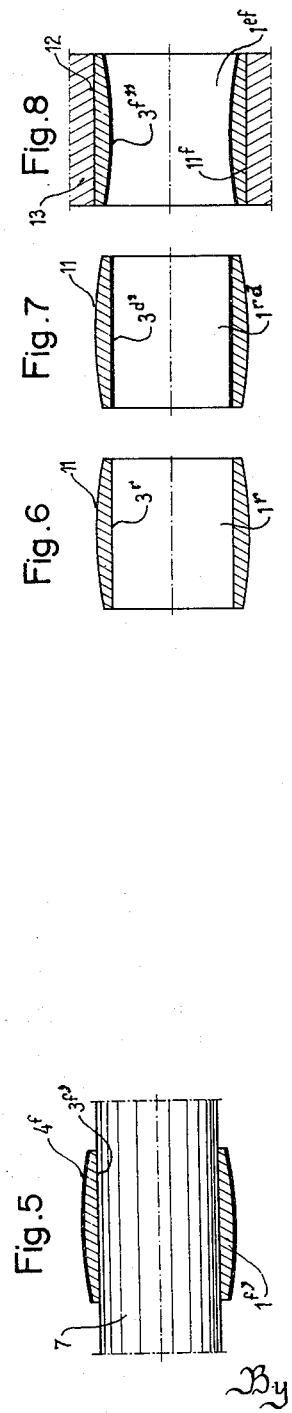
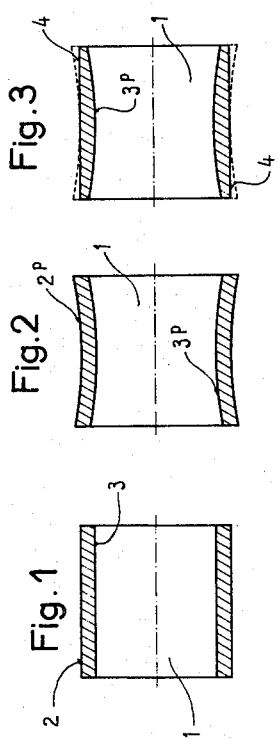
Inventor
ALFRED PITNER
By Albert L. Krey
Attorney

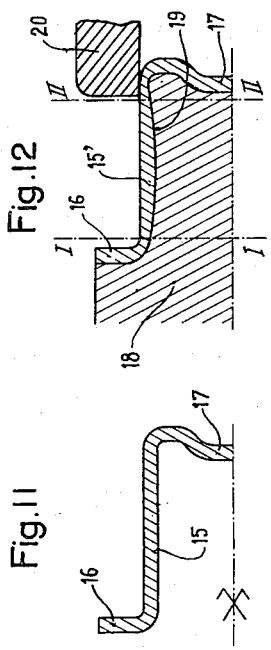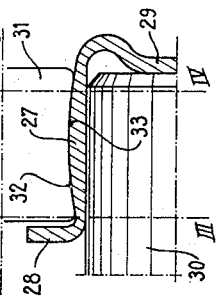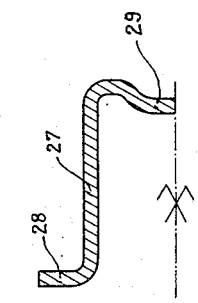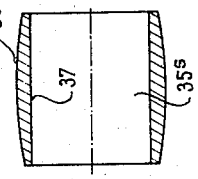

United States Patent Office 3,004,323
Patented Oct. 17, 1961

3,004,323
PROCESS OF MANUFACTURING BEARINGS AND BEARINGS RESULTING THEREFROM
Alfred Pitner, Paris, France, assignor, by mesne assignments, of one-half to Societé dite: Societe Anonyme des Roulements a Aiguilles, Rueil-Malmaison, France, a French company
Filed Dec. 23, 1957, Ser. No. 704,784
Claims priority, application France Dec. 28, 1956
5 Claims. (Cl. 29—149.5)

In bearings having elongated cylindrical or conical rolling elements, it is known, in the event of faulty alignment of the axis of the shaft bearing the inner race relative to the axis of the outer race of the same bearing, to try to locate the reaction between at least one of the races and the rolling elements, in the region of the middle of the generatrices of the rolling elements which transmit this reaction in such manner as to avoid stress concentration on one of the ends of the rolling elements and of the corresponding parts of the race, for such a concentration would be extremely detrimental to the maintenance of these bearing surfaces in action.

The present invention has for its object to devise a process of manufacturing bearings having elongated rolling elements such as needle bearings, in which one at least of the bearing races possesses a convex raceway, by a cold-forming operation involving no removal of material, this process doing away with the difficult trueing of a surface of revolution where the generatrices are not truly rectilinear.

The invention broadly resides in that the generatrix of the radial cross-section of the blank which is intended to form the convex bearing raceway is initially made rectilinear and the opposite generatrix, on the wall which is intended to make the ring rigid with its support, is made convex, and the blank is then deformed to invert the shapes of these generatrices.

More specificially, after hardening of at least the external cylindrical face of a blank adapted to be used as an inner bearing race, the convex inner face thereof is forced onto a cylindrical shaft constructed to receive it, whereby this inner face having convex generatrices takes the cylindrical form of the shaft while at the same time its outer cylindrical face takes, by radial deformation of the metal, a convex form.

Conversely, after hardening at least the inner cylindrical face of a blank adapted to be used as an outer bearing race, the outer convex face thereof is forced into a cylindrical bore formed to receive it, whereby said outer convex face takes the cylindrical form of this bore, while at the same time its inner cylindrical face takes, by radial deformation of the metal, a convex form.

Figure 18:
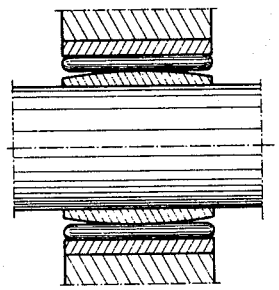
Figure 19:
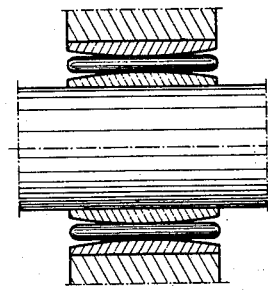

The attached drawings which are given by way of examples and cannot in any way limit the scope of the present patent application show diagrammatically:

FIG. 1 a diametrical section of the tubular blank.
FIG. 2 a diametrical section of the blank of FIG. 1 after having undergone a permanent deformation.
FIG. 3 the same blank, after the operation of the removal of metal.
FIG. 4 the blank of FIG. 3, deformed permanently and hardened on its outer face for use as an inner ring.
FIG. 5 the race forced on the shaft intended to receive it.
FIG. 6 the blank of FIG. 3 deformed elastically, after the release of the elastic deformation to which it was subjected.
FIG. 7 the blank of FIG. 6 hardened on its inner face for its use as an outer bearing race.
FIG. 8 the race forced into its receiving bore.
FIG. 9 the blank of FIG. 6, to be used as an inner bearing race, the outer face of this blank having been hardened.
FIG. 10, the race forced on the shaft intended to receive it.
FIG. 11 a blank according to a modification.
FIG. 12 said blank mounted on a mandrel of concave profile and being subjected to the action of a die.
FIG. 13 the same blank after removal of the ends.
FIG. 14 a blank in radial section, according to a further modification.
FIG. 15 the same blank mounted on a cylindrical mandrel, while being subjected to the action of a roller having a concave profile.
FIG. 16 the same blank after removal of the ends.
FIGS. 17 to 19 diametrical sections of needle bearings made up with bearing rings in accordance with the invention.

In these various figures, the hardened faces of the ring are illustrated by heavy lines. To facilitate understanding of the drawings, the radii of curvature of the convex faces of the bearing rings have also been considerably exaggerated.

In FIG. 1, the blank used is constituted by a section of tube having rectilinear generatrices 2 and 3.

In accordance with FIGURE 2, by any suitable known means, this blank is deformed in such manner that the two generatrices $2^p$ and $3^p$ are curved but remain parallel with each other, the outer generatrix $2^p$ of the blank being concave and its inner generatrix $3^p$ being convex.

The deformation being supposed to be permanent, the outer face of this blank is subjected to a removal of metal, for example by lathe turning, to provide externally a cylindrical face 4 (see FIG. 3); its radial cross-section then has an outer rectilinear generatrix 4, its inner face $3^p$ remaining convex.

The outer cylindrical face 4 at least is hardened, as shown at $4^d$ (see FIG. 4), and the blanks $1^{d'}$ is then forced over a cylindrical shaft 7 intended to receive it (see FIG. 5); during this operation, its convex face $3^p$ is deformed and becomes cylindrical as shown at $3^{f'}$ and due to the radial flow of metal, its cylindrical face $4^d$ simultaneously becomes a convex raceway, assuming the form $4^f$ and the dimensions required for the correct operation of the bearing into which it is incorporated.

If the blank shown in FIG. 2 has been elastically deformed and, while maintained in this condition of elastic deformation, is subjected on its outer concave face to a removal of metal which transforms the said concave face into a cylindrical face (see FIG. 3), the blank, after removal from the mandrel, elastically returns to its former condition by removal of the elastic strains to which it was subjected; the outer cylindrical face 4 of FIGURE 3 becomes convex as shown at 11 (see FIG. 6), whilst its inner face resumes its initial cylindrical shape with rectilinear generatrix $3^r$.

According to whether this blank should be used for making an outer bearing race or an inner bearing race, its inner face $3^r$ or its outer face 11 is hardened.

FIGURE 7 shows the case where the face $3^r$ has been hardened as shown at $3^{d'}$; the blank is then forced into a cylindrical bore 12 formed in a member 13 (see FIG. 8); in the course of this operation, its outer convex face 11 is transformed into a cylindrical face having rectilinear generatrices $11^f$ (FIG. 8) and its inner cylindrical face $3^{d'}$ becomes a convex face $3^{f''}$; the outer race $1^{ef}$ has thus the final form and dimensions for its correct operation in a bearing.

FIG. 9 shows a second embodiment of the blank $1^r$ of FIGURE 6, wherein the outer convex face 11 of this blank $1^r$ has been hardened as at $11^d$; the race $1^{rd'}$ thus obtained is mounted or forced over a cylindrical supporting shaft 14 (see FIG. 10) the inner rectilinear generatrix being shown at $3^{t'''}$ and the outer convex generatrix at $11^{df}$; the ring has then the final forms and dimensions corresponding to its correct state for operation.

This process of reversal of the profiles may also be used with a blank such as illustrated in FIGS. 3 and 6 obtained by other methods, which do not involve any removal of metal from the blank, on its cylindrical and convex faces.

FIGURE 15 shows in radial section a blind-ended tubular blank, which comprises a cylindrical portion 15, a flange 16 and a blind end 17; this flange is mounted on a mandrel 18 (see FIG. 12) having a concave generatrix 19, coaxial with a tubular drawing die 20; in operation, this die is forced over the cylindrical portion 15 of the blank and forces the metal of the said portion into the concavity of the mandrel 18.

The mandrel 18 is then withdrawn from the blank which is permitted by the elasticity of the metal of the blank, and the latter is cut along the two planes I—I and II—II. The tubular blank $15^s$ in FIGURE 13 is identical with the one shown in FIG. 3 and submitted to the operation of profile reversal above described.

In FIGURE 14, 27 is a tubular blank similar to that of FIGURE 11, which is mounted on a cylindrical mandrel 30 (see FIG. 15) opposite a roller 31 adapted to rotate about an axis $x$—$x$ and having a concave profile 32 matching with the convex profile 33 of the blank to be obtained; the blind-ended ring thus obtained is cut along the planes III—III and IV—IV to give a blank $35^s$ (see FIG. 24) similar to that of FIG. 6.

FIG. 17 shows a needle bearing embodying an outer race similar to that shown in FIG. 8, FIG. 18 a needle bearing embodying an inner race as shown in FIGS. 5 and 10, and FIG. 19 a needle bearing embodying both kinds of convex races.

Naturally, various modifications could be brought to the above described methods, as illustrated in the drawings, without departing from the scope of the invention.

What I claim is:

1. In a process of manufacturing an unsplit bearing race having a continuous mounting surface of revolution whose generatrix is rectilinear and a continuous convex raceway adapted to cooperate with elongated rolling elements, the steps comprising forming an unsplit blank ring having a first initial surface of revolution whose generatrix is rectilinear and a second initial surface of revolution whose generatrix is convex and permanently deforming said blank by force-fitting said second initial surface onto a support having a surface of revolution with rectilinear generatrices to transform said second initial surface into said mounting surface, whereby said first initial surface is transformed into said convex raceway.

2. A process of manufacturing an unsplit bearing race having a continuous mounting surface of revolution whose generatrix is rectilinear and a continuous hard convex raceway adapted to cooperate with elongated rolling elements, which comprises forming an unsplit blank ring having a first initial surface of revolution whose generatrix is rectilinear and a second initial surface of revolution whose generatrix is convex, surface-hardening at least said first initial surface, and permanently deforming said blank by force-fitting said second initial surface onto a support having a surface of revolution with rectilinear generatrices to transform said second initial surface into said mounting surface, whereby said hardened surface is transformed into said convex raceway.

3. A process of manufacturing an inner unsplit bearing race having an inner continuous mounting surface of revolution whose generatrix is rectilinear and a continuous hard convex outer raceway adapted to cooperate with elongated rolling elements, which comprises forming an unsplit blank ring having an outer initial surface of revolution whose generatrix is rectilinear and an inner initial surface of revolution whose generatrix is convex, surface-hardening at least said outer initial surface and forcing in the cold state said inner initial convex surface over the outer surface of revolution of the structure adapted to be supported by the bearing, the transverse dimensions of said latter surface being such that said blank is resiliently deformed to transform said inner initial surface into said mounting surface, in close fit with the surface of revolution of said structure, whereby said hardened surface is transformed into said convex raceway.

4. A process of manufacturing an outer unsplit bearing race having an outer continuous mounting surface of revolution whose generatrix is rectilinear and a continuous hard convex inner raceway adapted to cooperate with elongated rolling elements, which comprises forming an unsplit blank ring having an inner initial surface of revolution whose generatrix is rectilinear and an outer initial surface of revolution whose generatrix is convex, surface-hardening at least said first initial surface and forcing in the cold state said outer initial convex surface into the inner surface of revolution of the structure adapted to support the bearing, the transverse dimensions of said latter surface being such that said blank is resiliently deformed to transform said outer initial surface into said mounting surface, in close fit with the surface of revolution of said structure, whereby said hardened surface is transformed into said convex raceway.

5. A process of manufacturing an unsplit bearing race having a continuous mounting cylindrical surface and a continuous hard convex raceway adapted to cooperate with elongated rolling elements, which comprises forming an unsplit blank ring having a first initial cylindrical surface and a second initial surface of revolution whose generatrix is convex, surface-hardening at least said first initial surface and deforming said second initial surface into said mounting surface by force-fitting said second initial surface over a cylindrical member, whereby said hardened surface is transformed into said convex raceway.

References Cited in the file of this patent

UNITED STATES PATENTS

| | | |
|---|---|---|
| 1,139,192 | King | May 11, 1915 |
| 2,118,317 | Mader | May 24, 1938 |
| 2,189,956 | Kurzina | Feb. 13, 1940 |
| 2,210,132 | Searles | Aug. 6, 1940 |
| 2,259,325 | Robinson | Oct. 14, 1941 |
| 2,383,727 | Lewis | Aug. 28, 1945 |
| 2,398,364 | Elfstrom | Apr. 16, 1946 |
| 2,536,821 | Rappl | Jan. 2, 1951 |
| 2,544,109 | Richardson | Mar. 6, 1951 |
| 2,796,659 | Buske | June 25, 1957 |

FOREIGN PATENTS

| | | |
|---|---|---|
| 768,354 | France | May 14, 1934 |